March 24, 1970 — A. A. WAGNER — 3,502,357

METHOD OF FORMING PIPE RAILING FITTING

Filed Oct. 4, 1967 — 3 Sheets-Sheet 1

Inventor
Adolph A. Wagner
By Paul R. Puerner
Attorney

March 24, 1970     A. A. WAGNER     3,502,357
METHOD OF FORMING PIPE RAILING FITTING
Filed Oct. 4, 1967     3 Sheets-Sheet 2
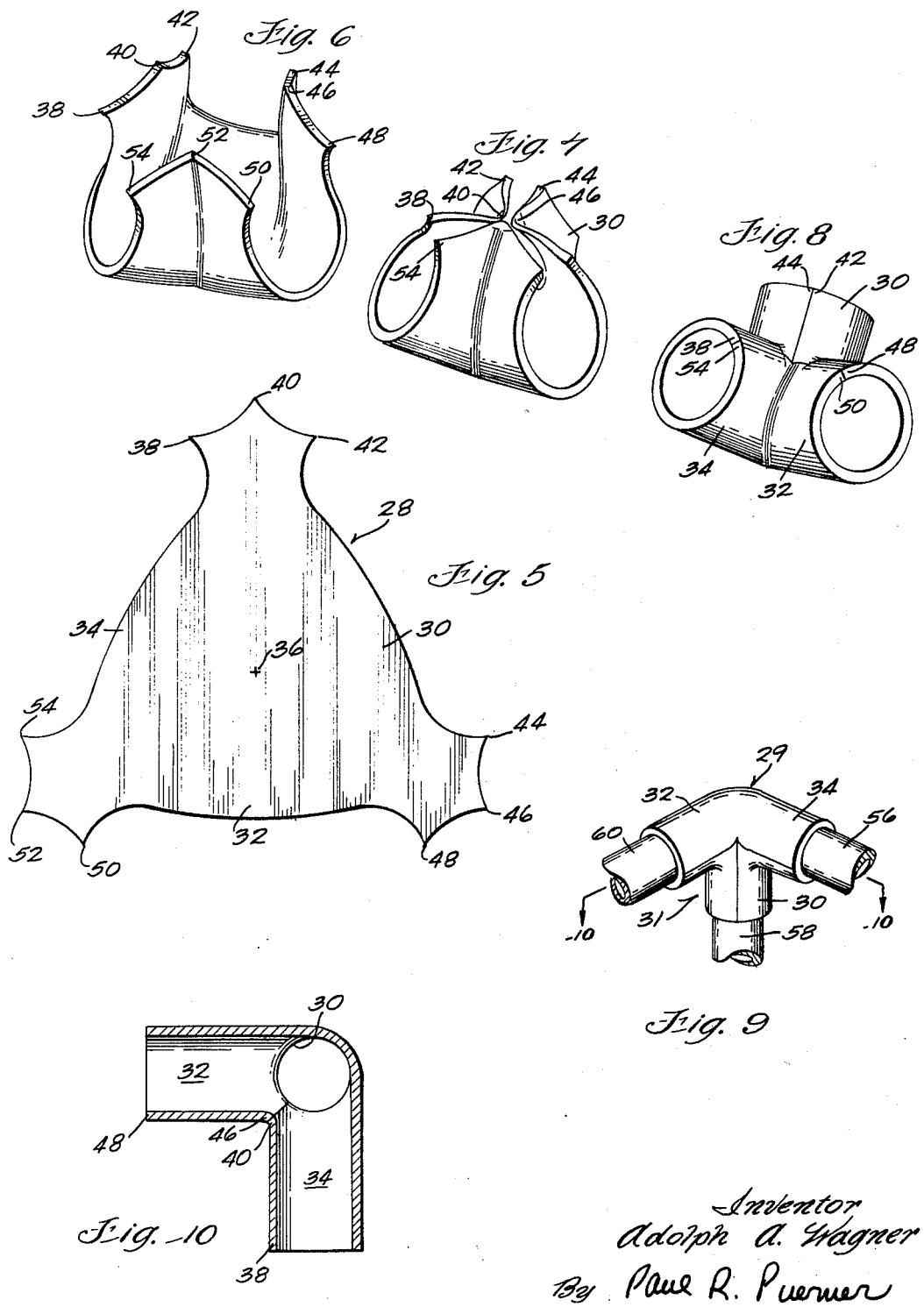
Inventor
Adolph A. Wagner
By Paul R. Puerner
Attorney March 24, 1970     A. A. WAGNER     3,502,357
METHOD OF FORMING PIPE RAILING FITTING
Filed Oct. 4, 1967     3 Sheets-Sheet 3
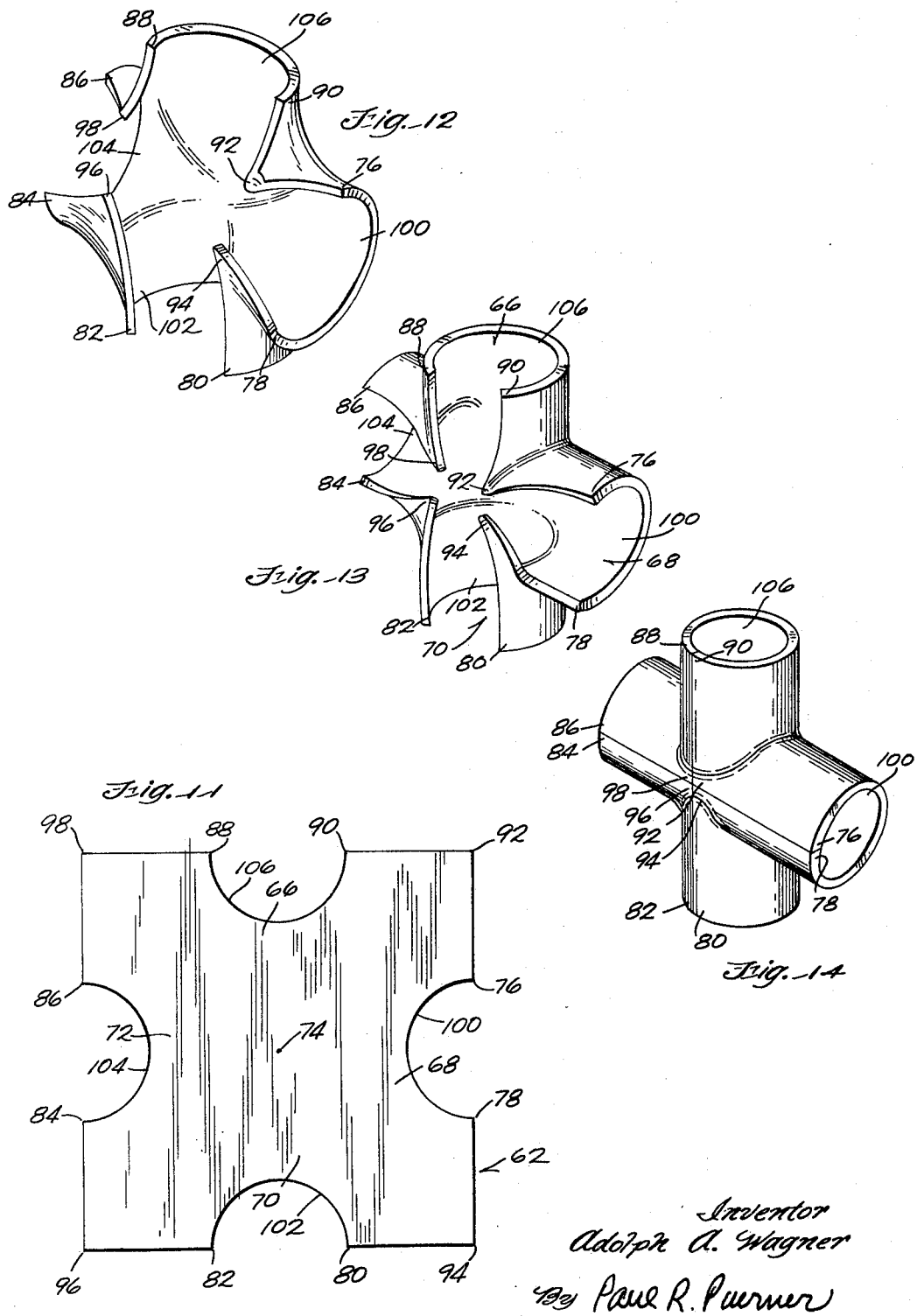
Inventor
Adolph A. Wagner
By Paul R. Puerner
Attorney United States Patent Office 3,502,357
Patented Mar. 24, 1970

3,502,357
METHOD OF FORMING PIPE RAILING FITTING
Adolph A. Wagner, 3454 N. Shepard Ave.,
Milwaukee, Wis. 53211
Filed Oct. 4, 1967, Ser. No. 672,839
Int. Cl. E04g 7/00; E16f 7/00; F16l 41/00
U.S. Cl. 287—54     6 Claims

ABSTRACT OF THE DISCLOSURE

This disclosure comprises a pipe railing fitting made by stamping a blank from a sheet of metal and then shaping the blank into a fitting by a series of forming steps.

BACKGROUND OF THE INVENTION

Field of invention

This invention relates to pipe railing fittings for use in constructing railings at stairways and other similar locations.

Description of the prior art

Prior to this invention, pipe railing fittings were made from castings. The principal object of this invention is to make a pipe railing fitting from a flat stamping to thereby reduce the cost of manufacture, provide a better appearance, and facilitate assembly of the fitting with pipe railing members.

SUMMARY OF THE INVENTION

One embodiment of this invention involves the fabrication of a pipe railing T fitting having a pair of main body portions and a side outlet portion. This is accomplished by first stamping a blank from a piece of sheet metal, said blank comprising a pair of equally shaped half portions lying on opposite sides of the center line of the blank with each of said half portions having an end portion extending therefrom. The half portions are then progressively shaped into a T fitting by a series of forming steps, wherein each half portion is formed into a cylindrically shaped main body portion with the end portions of said half portions together forming the side outlet for the T.

A T fitting made in accordance with the present invention is less costly to manufacture, is easier to assemble and has a superior appearance as compared to a fitting made from a casting which was the conventional practice prior to this invention.

Other objects and advantages of the present invention will appear in the course of the detailed description of the invention appearing hereinafter.

The accompanying drawings illustrate the best mode presently contemplated of carrying out the invention.

IN THE DRAWINGS

FIG. 5 is a plan view of the blank piece of material used in the manufacture of an elbow fitting having a side outlet;

FIGS. 6, 7 and 8 are perspective views showing the fitting in its various stages of manufacture;

FIG. 9 is a perspective view of the fitting shown in FIG. 8 as it might be installed as a part of a pipe railing;

FIG. 10 is a sectional view taken along line 10—10 of FIG. 9;

FIG. 11 is a plan view of the blank piece of material used in the manufacture of a cross T fitting; and FIGS. 12, 13 and 14 are perspective views showing the fitting in its various stages of manufacture.

Figure 1:
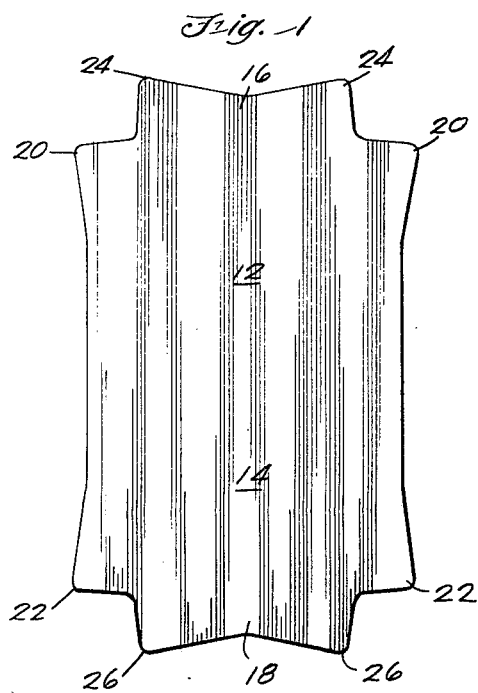
FIGURE 1 is a plan view of the blank piece of material from which a pipe railing T fitting is formed following the teachings of this invention.

Referring now to the drawings in detail, FIGS. 1–4 show one embodiment of the present invention wherein a pipe railing T is the type of fitting involved. FIG. 1 shows a blank 10 of any suitable material such as steel or aluminum which may be fabricated by a stamping process. Such blanks can be made by high speed machinery at a relatively low cost and with very accurate dimensions.

Blank 10 is of generally rectangular shape having identically shaped portions 12 and 14 lying on opposite sides of a center line 17. Portions 12 and 14 are each provided with end portions 16 and 18 of reduced width. The corners of portion 12 are numbered 20, 20 and the corners of portion 14 are numbered 22, 22. The corners of end portions 16 and 18 are numbered 24, 24 and 26, 26, respectively.

Figure 2:
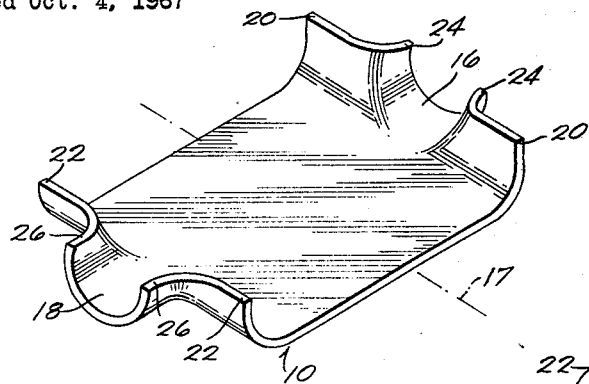
FIGS. 2, 3 and 4 are perspective views of the fitting showing the various stages of its manufacture, with FIG. 4 showing the fitting in its finished state.
Figure 4:
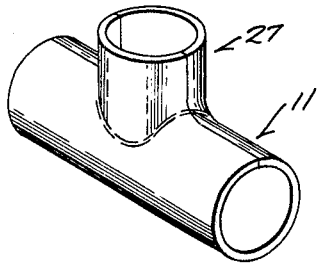

The first step in the fabrication of the finished T 11 shown in FIG. 4 is to form the blank 10 into the shape shown in FIG. 2. Such forming includes the forming of portions 16 and 18 into a semi-cylindrical shape while at the same time turning up the edges 20, 20 and 22, 22 of portions 12 and 14 in a smoothly curved configuration such as that shown in FIG. 2.

Figure 3:
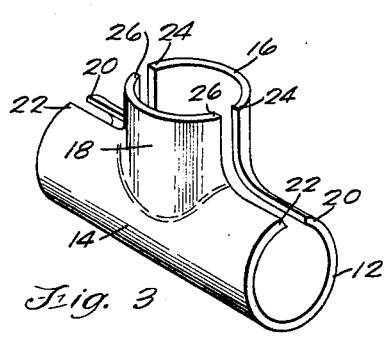

The next step in the fabrication process is to form the blank from the FIG. 2 configuration to its FIG. 3 configuration. Such step involves the further forming of portions 12 and 14, which, as shown in FIG. 3 are curved to a substantially cylindrical shape, wherein corners 20, 20 of portion 12 are brought to a position substantially adjacent to corners 22, 22 of portion 14. This step will also bring semicylindrical portions 16 and 18 to a position where they together form a substantially cylindrical shape with their respective corners 24, 24 and 26, 26 lying substantially adjacent each other.

The final step in the fabrication process is to form the blank from the configuration shown in FIG. 3 to its finished shape as shown in FIG. 4. This final step will bring corners 20, 20 and 22, 22 into contact with each other and will bring corners 24, 24 and 26, 26 also in contact with each other. The result is that portions 12 and 14 together will form a cylindrical wall which becomes the main portion of the T, whereas portions 16 and 18 together will form a cylindrical side outlet 27 to complete the standard T configuration.

The resulting T fitting shown in FIG. 4 is of more uniform appearance than a T made by the conventional casting process. The surface of the fitting is smooth, requiring no grinding and polishing as is the case with a casting. The T having been made from a stamping is of lighter weight and involves less total material. The cost of fabrication in the present method is considerably less than that of a casting. The comparative cost is estimated at about 50% that of a casting. Other advantages relate to the ease of assembly into a pipe railing wherein the formed fitting, being of closer dimensional tolerances, fits easier with the railings to which it is attached. Furthermore, the formed fitting, being either of carbon steel or aluminum, results in a much simpler welding process in those cases where the joints are welded. In the case where cast fittings are used, more difficult welding techniques are required. Finally, since the material of the fitting is much closer to that of the railing materials used, the external appearance of the finished railing is more uniform with a formed fitting as compared with a cast fitting.

Referring now to the second embodiment of the present invention shown in FIGS. 5–10, the basic principles involved in this invention are the same as those previously described with respect to the embodiment shown in FIGS. 1-4.

FIG. 5 shows the stamped blank 28 which is designed for forming a 90° elbow fitting 29 having a side outlet 31 as shown in FIG. 9. Blank 28 is comprised of three equally shaped portions 30, 32 and 34 equally spaced around a center point 36. Portions 30, 32 and 34 are provided with pointed corners 42, 44; 48, 50 and 54, 38 respectively. The respective portions 30, 32 and 34 terminate at pointed corners 40, 46 and 52, as shown in FIG. 5.

The first step in the fabrication process is to form the blank of FIG. 5 into the configuration shown in FIG. 6. Such forming step involves the partial formation of portions 30, 32 and 34 into a cylindrical configuration. The next step is to form the blank from the FIG. 6 to the FIG. 7 configuration wherein the formation of portions 30, 32 and 34 into a cylindrical configuration is continued.

As shown, the forming step from the FIG. 6 to the FIG. 7 configurations will bring corners 48, 50 of portion 32, corners 42, 44 of portion 30, and corners 38, 54 of portion 34 to a position substantially adjacent each other. In such position corners 40, 46 and 52 will also be positioned substantially adjacent each other.

The final step in the fabrication process is to form the blank from the configuration shown in FIG. 7 to that shown in FIG. 8. This final step will bring corners 48, 50; 38, 54; 42, 44 and 40, 46, 52 into contact with each other. The result is that each of portions 30, 32 and 34 will be formed into a cylinder wtih portions 32, 34 constituting the two legs of the 90° elbow and portion 30 constituting a side outlet 31 for the elbow.

Just as in the case of the T fitting previously described, the resulting elbow fitting as shown in FIGS. 9 and 10 is of more uniform appearance than an elbow made by the conventional casting process. The surface of the fitting is smooth, the cost is less and the fitting can be assembled into a pipe railing by the use of simplified welding techniques. FIG. 9 shows how fitting 29 may be assembled with pipe members 56, 58 and 60. Welding of the pipes to the fitting can be accomplished by simple, easily performed welding methods because the material of the fitting (steel or aluminum) is substantially the same as that of the pipe.

Referring now to the third embodiment of the present invention shown in FIGS. 11-14, the basic principles involved in this invention are the same as those previously described with respect to the embodiments shown in FIGS. 1-10.

FIG. 11 shows the stamped blank 62 which is designed for forming a cross T fitting 64 as shown in FIG. 14. Blank 62 is of substantially square shape having corners 92, 94, 96 and 98, and is comprised of four equally shaped portions 66, 68, 70 and 72 spaced about a center point 74. Portions 66, 68, 70 and 72 are each cut-out in a semicircular shape as indicated by reference numerals 106, 100, 102 and 104, respectively. Such cut-out portions terminate at points 88, 90, 76, 78, 80, 82, 84 and 86.

The first step in the fabrication process is to form the blank of FIG. 11 into the configuration shown in FIG. 12. Such forming step involves the partial formation of portions 66, 68, 70 and 72 into a cylindrical configuration. The next step is to form the blank from the FIG. 12 to the FIG. 13 configuration wherein the formation of portions 66, 68, 70 and 72 into a cylindrical configuration is continued.

As shown, the forming step from the FIG. 12 to the FIG. 13 configurations will bring corners 76, 78, corners 80, 82, corners 84, 86 and corners 88, 90 towards each other. Also as shown in FIG. 13 the points 92, 94, 96 and 98 will be positioned substantially at a common point.

The final step in the fabrication process is to form the blank from the configuration shown in FIG. 13 to that shown in FIG. 14. This final step will bring corners 76, 78, corners 80, 82, corners 84, 86, corners 88, 90 into contact with each other. Furthermore, such final step will bring points 92, 94, 96 and 98 to a common point as clearly shown in FIG. 14.

Although but three embodiments of the present invention have been illustrated and described, it will be apparent to those skilled in the art that various changes and modifications may be made therein without departing from the spirit of the invention.

What is claimed is:

1. A pipe railing elbow fitting with a side outlet comprising:
   a flat stamping of metal material comprised of three equally shaped portions, each of said portions having edges radiating from a common corner, said stamping formed into said fitting by a series of forming steps, whereby said common corners terminate at a common point, and said edges radiate from said common point in an abutting relationship.

2. A pipe railing cross T fitting comprising:
   a flat stamping of metal material comprised of four equally shaped portions having edges radiating from common corners, said stamping formed into a cross T fitting by a series of forming steps, whereby said common corners terminate at a common point, and said edges radiate from said common point in an abutting relationship.

3. The method of making a pipe railing elbow fitting having a side outlet comprising the following steps:
   stamping a blank member from a sheet of metal, said blank member having three equally shaped portions; and
   shaping said blank into an elbow fitting of unitary construction by a series of forming steps whereby said three equally shaped portions of said blank are progressively bent into three cylindrical shaped portions.

4. The method of making a pipe railing cross T fitting comprising the following steps:
   stamping a blank from a sheet of metal, said blank having four equally shaped portions; and
   shaping said blank into a cross T fitting of unitary construction by a series of forming steps whereby said four equally shaped portions of said blank are progressively bent into four cylindrical shaped portions.

5. The method of making a pipe railing elbow fitting having a side outlet comprising the following steps:
   stamping a blank member from a sheet of metal, said blank having three equally shaped portions, said portions having edges radiating from common corners;
   shaping said blank into a fitting of unitary construction by a series of forming steps whereby said three equally shaped portions of said blank are progressively bent into three cylindrical shaped portions with said common corners terminating at a common point, said edges radiating from said common point in an abutting relationship after said forming steps are completed.

6. The method of making a pipe railing cross T fitting comprising the following steps:
   stamping a blank member from a sheet of metal, said blank having four equally shaped portions, said portions having edges radiating from common corners;
   shaping said blank into a cross T fitting of unitary construction by a series of forming steps whereby said four equally shaped portions of said blank are progressively bent into four cylindrical shaped portions with said common corners terminating at a common point, said edges radiating from said common point in an abutting relationship after said forming steps are completed.

(References on following page)

References Cited

UNITED STATES PATENTS

| | | | |
|---|---|---|---|
| 389,180 | 9/1888 | Wiggins | 285—156 |
| 2,128,720 | 8/1938 | Tweedale | 285—156 |
| 2,470,499 | 5/1949 | Lapp | 285—156 |
| 3,021,159 | 2/1962 | Back | 287—54 |

FOREIGN PATENTS 23,806 10/1897 Great Britain.

EDWARD C. ALLEN, Primary Examiner

U.S. Cl. X.R.

29—157; 113—116; 285—150